No. 776,561.　　　　　　　　　　　　　　　　　　　　　　　　　　　Patented December 6, 1904.

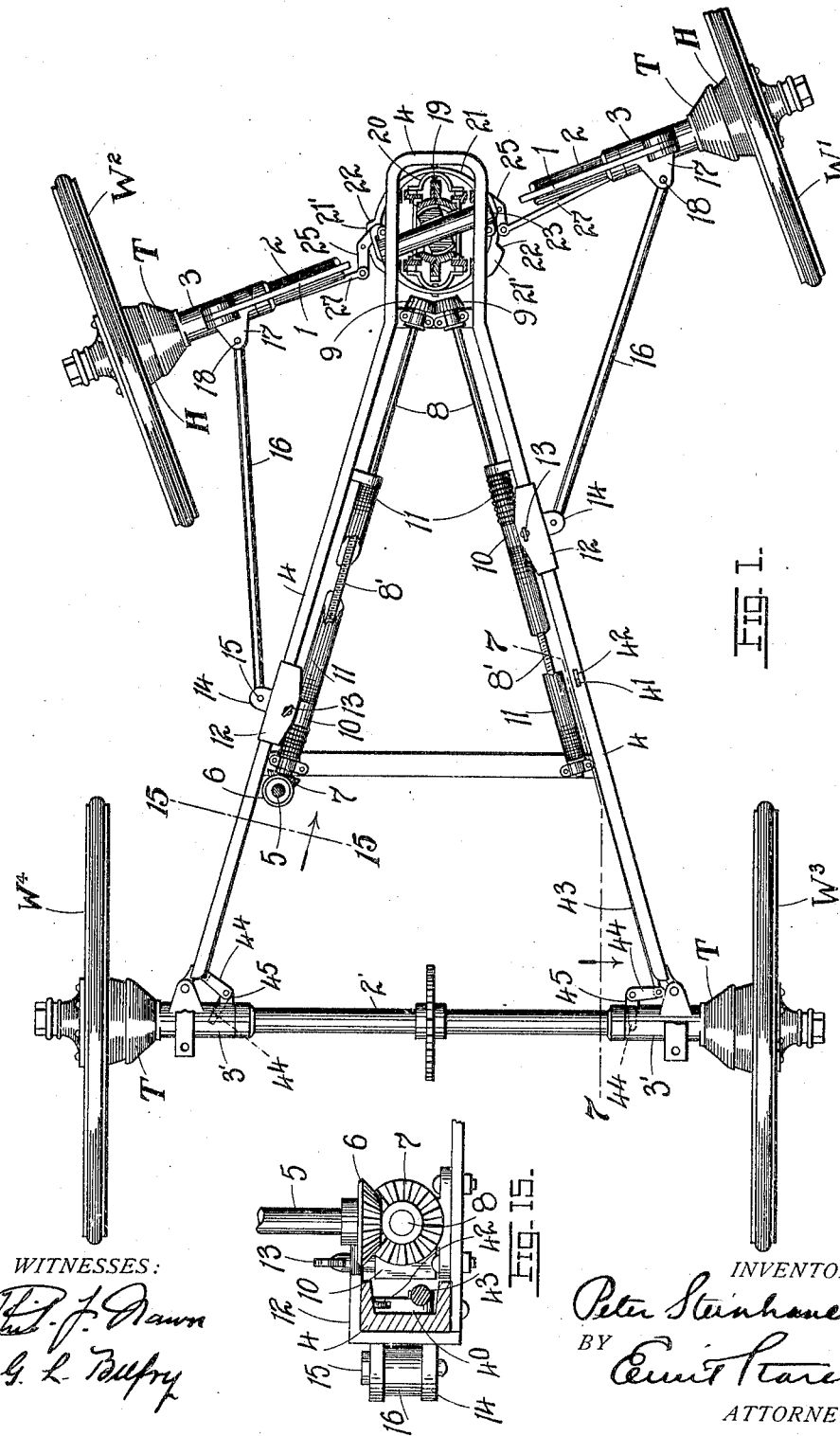

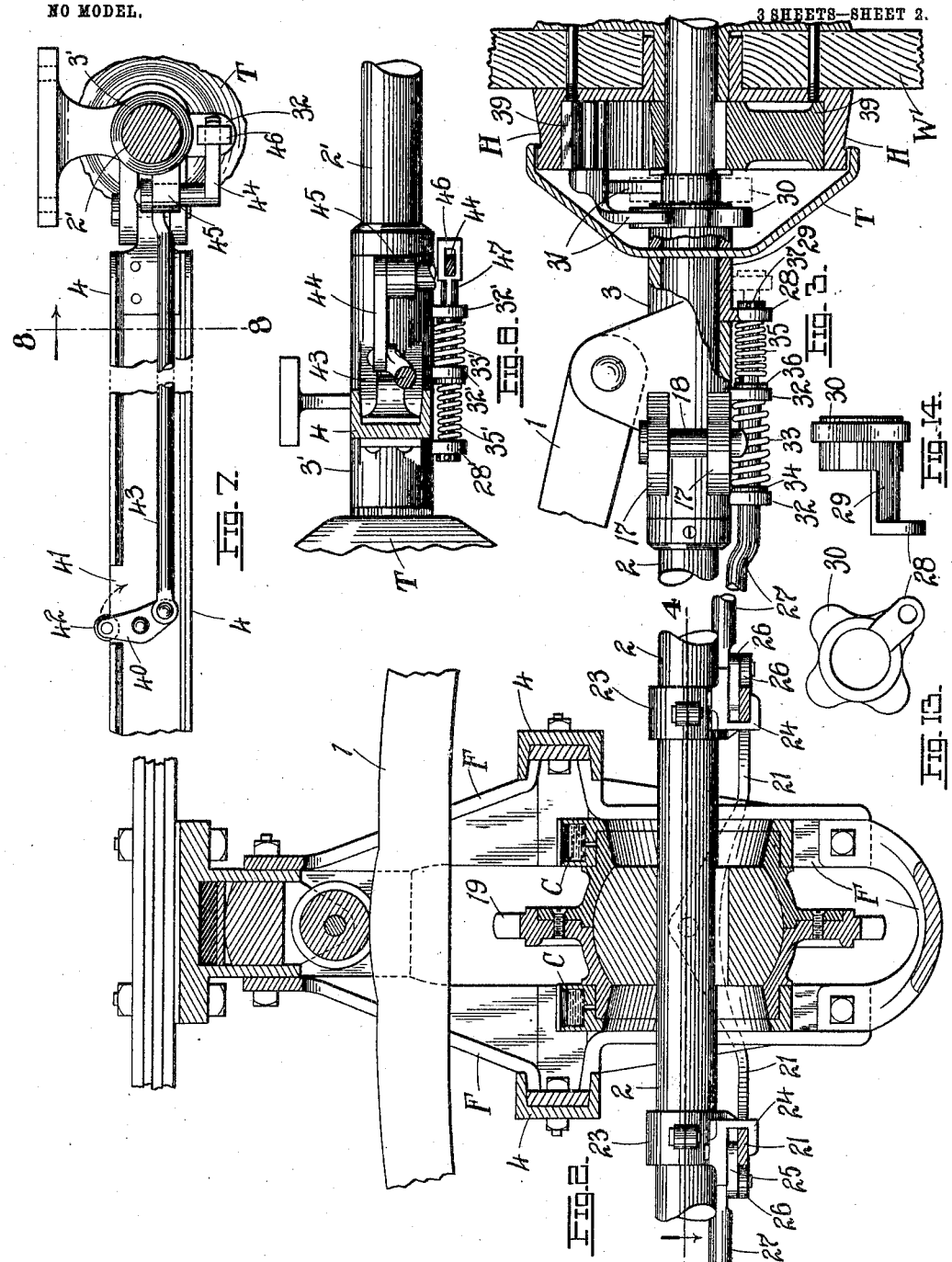

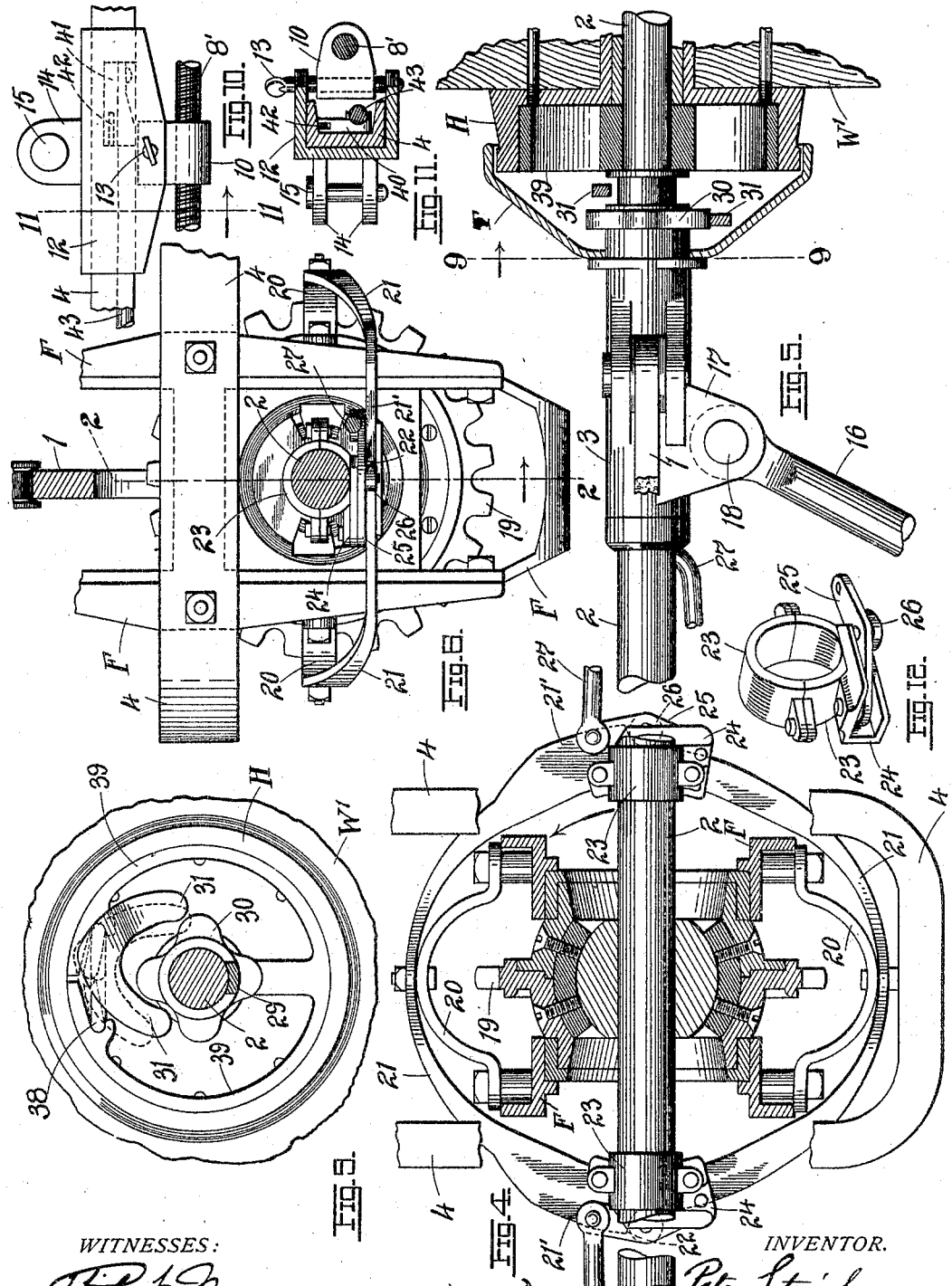

UNITED STATES PATENT OFFICE.

PETER STEINHAUER, OF ST. LOUIS, MISSOURI.

AUTOMOBILE DRIVING-GEAR.

SPECIFICATION forming part of Letters Patent No. 776,561, dated December 6, 1904.

Application filed March 10, 1904. Serial No. 197,577. (No model.)

*To all whom it may concern:*

Be it known that I, PETER STEINHAUER, a citizen of the United States, residing at St. Louis, State of Missouri, have invented certain new and useful Improvements in Automobile Driving-Gear, of which the following is a full, clear, and exact description, reference being had to the accompanying drawings, forming a part hereof.

My invention has relation to improvements in automobile driving-gear; and it consists in the novel construction and arrangement of parts more fully set forth in the specification and pointed out in the claims.

In the drawings, Figure 1 is a top plan of the wagon-frame with front truck deflected to the left. Fig. 2 is a vertical transverse section on line 2 2 of Fig. 6, taken through the frame suspended from the front truck. Fig. 3 is a combined rear elevation and section of the front right-hand wheel and parts controlling the clutch mechanism thereof. Fig. 4 is a horizontal section on line 4 4 of Fig. 2. Fig. 5 is a combined top plan and section of the front right-hand wheel and parts controlling the clutch mechanism thereof. Fig. 6 is a side elevation of the frame suspended from the front truck, parts being in section. Fig. 7 is a vertical section on line 7 7 of Fig. 1. Fig. 8 is a transverse vertical section on line 8 8 of Fig. 7. Fig. 9 is a transverse vertical section on line 9 9 of Fig. 5 with the dust plate or guard omitted. Fig. 10 is a detail in plan, showing the traveling shoe and a section of the actuating screw-shaft therefor. Fig. 11 is a transverse section on line 11 11 of Fig. 10. Fig. 12 is a perspective of the strap carrying the tripping-lever which actuates the clutch-cam. Fig. 13 is an end view of the clutch-cam. Fig. 14 is a side elevation thereof, and Fig. 15 is a cross-section on line 15 15 of Fig. 1.

My present invention is an improvement on the driving-gear shown and described in United States Letters Patent No. 696,210, granted me on March 25, 1902, and while contemplating the several objects therein set forth, as well as those covered in a previous patent, No. 672,718, dated April 23, 1901, it materially simplifies the details of construction by which the steering of the vehicle is accomplished and by which the deflection of the front axle of the vehicle is effected, in the event that it is desirable to turn a corner or travel in a line deviating from a direct one. While the connection in the present case between the front axle and the coupling-pole is rigid, the connections are simpler than the corresponding parts of the patented construction referred to and are under better control of the operator, the deflection of the front axle being controlled from the shaft of the motor by which the vehicle is propelled.

The present invention, too, presents further and other advantages, which will be better apparent from a detailed description thereof, which is as follows:

Referring to the drawings, 1 represents the front truck, and 2 the front axle thereof. 3 3 represent the bearings therefor, and $W'$ $W^2$, respectively, the right and left wheel of the said front truck. The rear axle is represented by $2'$, its bearings by $3'$, and its corresponding wheels by $W^3$ $W^4$. While it is equally as desirable in the present invention as it was in the patented construction referred to that a rigid connection be at all times maintained between the front axle 2 and the coupling-pole 4, the construction by which this connection is accomplished is herein materially simplified over the patented device, as is also the mechanism by which any given deflection is imparted to the front axle. In the present invention I provide a vertically-disposed steering-shaft 5, which may be coupled in any mechanical and convenient manner to the motor (not shown) carried by the vehicle, whether such motor be a gasolene-engine or an electric or steam motor, and inasmuch as the present invention is not concerned with any specific manner of coupling the steering-shaft to or disengaging it from such motor these connections are not shown herein, it being within the province of the skilled mechanic to effect them in any manner whatsoever.

The steering-shaft 5, which may be supported in position in any mechanical manner above the truck-frame, is provided at the lower end with a bevel-pinion 6, which meshes with a corresponding pinion 7 at the adjacent end of one of two converging screw-shafts 8 8, mounted in suitable bearings, the meeting ends of the said shafts terminating in bevel-pinions 9 9, meshing with one another, so that as motion of rotation is imparted to one shaft in one direction a motion is simultaneously imparted to the other shaft in a reverse direction. Each shaft 8 is provided with a screw-threaded section 8', over which is free to travel a nut 10, said screw-threaded portion 8' being protected against dust and dirt by a collapsible tubular cover or casing 11, disposed on either side of each nut and having its opposite ends secured to said nut and to the shaft-bearings, so that as the nut travels back and forth on the shaft the cover or casing 11 folds or expands, as the case may be. This casing may be made of cloth, silk, or other suitable fabric, and in Fig. 1 sections thereof are removed to expose the interior screw-threaded portion of the shafts 8 8. It is apparent from the foregoing that upon rotation being imparted to the diverging shafts 8 8 the nut on one will travel along the same in one direction and that on the other in the opposite direction, the reason therefor being that since the shaft cannot move the nut must.

The coupling-pole 4 in the present instance is of the form of a channel-bar for purposes which will presently appear. Adapted to loosely reciprocate along the respective sides of the coupling-pole are the shoes 12 12, which are secured to the nuts 10 by pins 13, Fig. 11, the vertical face of each shoe being provided with ears 14, between which is pivotally secured, by means of a pin 15, one end of a connecting-rod 16, the opposite or forward end of the latter being pivotally secured between lugs or ears 17, through a pin 18, to the bearing 3 of the front axle. It is apparent from the foregoing that when the shoes 12 12 are directly opposite one another—that is, when they occupy a middle position on the coupling-pole—the front axle 2 will be parallel to the rear axle and the vehicle will travel in a direct line; but (see Fig. 1) when motion is imparted to the shafts 8 8 in one direction or the other one of the nuts 10 and shoe 12 coupled thereto will travel in one direction, and the other nut and shoe will travel in the opposite direction, (along the shaft and coupling-pole, respectively,) thereby through the instrumentality of the connecting-rods 16 16 deflecting the front axle in one direction or the other, Fig. 1, causing the vehicle to turn to one side or turn a corner, as is obvious. In thus turning a corner it is desirable, of course, that the inside wheel of each truck shall for the time being be disconnected from its axle to allow the outer wheel to turn without causing the inner wheel to slip along the ground. This requirement of course was likewise imposed on the patented construction referred to, though in the present case I have materially simplified the mechanism by which such release is accomplished. This mechanism may be described as follows: The yoke or frame F, suspended from the truck-bar 1 and through which the axle 2 passes and within which it freely revolves, is substantially the same as in the patent aforesaid, except that in the present case I provide the same with oil-cups C for lubricating the driving-sprocket 19. In the present instance, however, I secure pivotally to said yoke 17, through the medium of straps 20, a horizontally-disposed ring 21, having portions of its periphery on either side of the axle 2 concentric with the center of the axis of said axle and having likewise diametrically-disposed shoulders 22 connecting said concentric curvatures with the expanded portions 21', Figs. 1, 4. Secured to the axle 2 directly over or opposite the portions 21' of the ring 21 are straps 23, the lower section of each strap having a housing 24, Fig. 12, within which is pivoted one end of a short bent lever 25, whose medial portion carries on its under side a roller 26, normally (when the axles 2 2' are parallel) resting against the edge of the ring at the base of the shoulder 22. The opposite end of the lever 25 is pivotally secured to the adjacent end of a rod 27, whose opposite end passes through the ear or lug 28 of the reduced portion 29 of the hub of the lobed clutch-cam 30, which latter, as in the Patent No. 696,210 referred to, is free to slide along the axle 2. Unlike the clutch-cam of said patent, however, the present cam is provided with several lobes in order to make it more quickly responsive in its engagements with or disengagements from the arms of the rotating clutch-fork 31. The outer end of each rod 27 passes loosely through ears or lugs 32, projecting from the bearing 3, a spring 33, Fig. 3, encircling the rod between the lugs and having one end bearing against one lug and the opposite against a collar 34, secured to the rod. Another but weaker buffer-spring 35 encircles the rod between one of the lugs 32 and the movable lug 28, one end of the latter spring bearing against the lug 28 and the opposite end against the collar 36, secured to the rod. The rod terminates in a head 37, which prevents its disengagement from the ear 28. The clutch-fork 31, the toggle-link 38, the split clutch-disk 39, the hub H of the wheel, and dust-guards T are the same as in my patent referred to, except that the fork members of the clutch-fork 31 are reversed—that is to say, the member which is farthest removed from the clutch-disk now serves to effect frictional contact between the said clutch-disk and the hub, and the member which is adjacent to the link 38 serves to break the toggle-joint and effect disengagement between the parts, and this for the reason that under the present construction the clutch-cam 30 is forced toward the wheel to effect disengagement between it and the axle instead of being drawn from the wheel, as was the case in my patented construction referred to.

From the foregoing the action of the ring 21 now becomes apparent. The moment the axle 2 becomes deflected by the movement of the shoes 12 in proper direction the roller 26, which is on the side of what would be the inner wheel, (when the vehicle is to make a turn,) is obliged to travel along the shoulder 22 of the said ring, the riding up along such shoulder causing the lever 25 to be tripped or oscillated about its pivotal end, the roller eventually resting on the edge of the expanded portion 21' of the ring, Fig. 1. In thus tripping the lever 25 the latter forces or shoves the rod 27 outwardly or toward the adjacent wheel $W^2$ in Fig. 1. The outward travel of the rod 27 shoves (through the medium of the spring 35) the clutch-cam 30 in the path of that arm of the fork 31 which is adjacent to the toggle 38, thereby "breaking" the toggle-joint and releasing the clutch-disk 39 from the hub H, leaving the wheel loose on the axle. (See dotted position of fork in Fig. 9 and dotted position of clutch-cam 30 in Fig. 3.) The release of the proper wheel from the axle leaves the other wheel to still turn with said axle, being that the latter wheel is still clutched to such axle. The reason that the outer wheel remains unaffected by the deflection of the axle is that the roller 26 adjacent thereto travels along the concentric portion of the ring 21 away from its shoulder 22, so that the lever 25 on that side is not disturbed, Fig. 1. The spring 35 of course is sufficiently stiff to force the cam 30 into engagement with the members of the fork 31; but should it foul either arm before it is wholly inside of the circle described by it the spring will give and avoid jarring of the parts. The stronger spring 33 of course assists the parts in their restoration to their normal positions as the axle 2 is being brought back into parallelism with the rear axle 2'. Should it be desirable to steer the vehicle in the stable by hand, the pins 13 are removed, so as to uncouple the nuts 10 from the shoes 12, when the stableman can readily control the vehicle, as is obvious, the shoes being ever free to move along the coupling-pole to effect such results.

Of course when the inner wheel of the front truck is released from its axle, as above stated and described, it is essential that the corresponding wheel of the rear truck should be similarly released. This is accomplished by the following connections: Pivoted to the base of the channel constituting the coupling-pole is a bell-crank tripping-lever 40, projecting upwardly through a slot 41 of the channel a suitable distance and carrying at its free end an antifriction-roller 42, Fig. 7, directly in the path of the shoe 12. The lower end of the lever 40 is pivotally coupled to the adjacent end of a rod 43, whose opposite end is pivotally secured to the free end of one arm of a bent rocking lever 44, the vertical portion of said rocking lever being mounted in a lug or bearing-bracket 45, projecting from the bearing 3' of the rear axle 2'. The end of the opposite or lower arm of said rocking lever passes loosely through the terminal loop 46 of a stem 47, confined between lugs 32' 32' of the bearing 3' and terminating in the lug 28', Fig. 8, of the rear clutch-cam, the stem 47, like the rod 27, being provided with springs 33' and 35', located similarly to and performing the same functions as the corresponding springs 33 and 35, whose operation has already been explained. By referring to Fig. 7, should the shoe 12 be caused to travel so as to trip the lever 40 in the direction indicated by the arrow in said figure it is obvious that this would exert a pull on the rod 43, the latter rocking the lever 44 in a direction to cause the lower arm thereof to force the stem 47 inwardly, such inward movement in turn forcing the rear clutch-cam into proper relation with the rear clutch-fork, and release the rear wheel from its axle. Thus the inner wheels of both trucks would be released at practically the same moment. Of course in the deflection of the front axle the outer wheel will always draw its shoe 12 away from the lever 40, whereas the inner wheel will force it toward it, so that both inner wheels will become unclutched at practically the same time in the manner already indicated. In the restoration of the parts to their normal positions the clutch-cams by whose outward movement the wheels on the inside are released from their axles will be drawn inward, thus causing the clutch-fork to expand the split clutch-disk and again clamp the wheels tightly to their respective axles, Fig. 9.

Such features of the present drawings, to which no reference is made, are either well known in the art or covered by prior patents issued to me, and these require no detailed description for that reason.

The present construction, (which of course may be modified in details without affecting the nature or spirit of my invention,) though capable of being operated by hand, is intended to be coupled to the driving-motor of the vehicle, it is capable of deflecting the front axle not only instantly, but to any angle which will insure the proper turning of the vehicle to the right or left, it is positive in its action and reliable, and possessing, as it does, parts not subjected to special abuse will last indefinitely without the necessity of undergoing repair.

Having described my invention, what I claim is—

1. In an automobile driving-gear, front and rear axles, means for imparting rotation to the same, a coupling-pole connecting the front and rear trucks, a pair of screw-shafts on the vehicle, means for rotating said shafts, nuts traveling along said screw-shafts, and intermediate connections between said nuts and front axle for deflecting the latter upon rotation of the shafts in either direction, substantially as set forth.

2. In an automobile driving-gear, front and rear axles, means for propelling the vehicle, a coupling-pole connecting the front and rear trucks, a pair of converging screw-shafts on the vehicle, means for simultaneously rotating said shafts, sliding shoes mounted on the vehicle, connecting-rods between the shoes and front axle, means for shifting the shoes backward and forward upon the rotation of the screw-shafts in proper direction and simultaneously deflecting the front axle, substantially as set forth.

3. In an automobile driving-gear, front and rear axles, means for propelling the vehicle, a coupling-pole connecting the front and rear trucks, a pair of converging screw-shafts on the vehicle, means for simultaneously rotating said shafts, nuts traveling on the screw-shafts, sliding shoes detachably coupled to the nuts and mounted on the coupling-pole, and connecting-rods between the shoes and front axle, the latter being deflected upon the rotation of the screw-shafts, substantially as set forth.

4. In an automobile driving-gear, a pair of converging screw-shafts adapted to be simultaneously rotated in opposite directions, a nut on each shaft, a collapsible casing or cover enveloping the screw-threaded portion of each shaft and having a fixed end, the opposite end being coupled to the nut, whereby the same can fold or collapse upon the travel of the nut in one direction, and to unfold upon the travel of the nut in the opposite direction, substantially as set forth.

5. In an automobile driving-gear, front and rear axles, wheels loosely mounted on the same, clutches for coupling the wheels to the axles, means for deflecting the front axle, a central stationary ring disposed on one side of the front axle, clutch-controlling devices carried by the front axle, and suitable formations on said ring for actuating said clutch-controlling devices in one direction upon the deflection of the front axle, substantially as set forth.

6. In an automobile driving-gear, front and rear axles, wheels loosely mounted on the same, clutches for coupling the wheels to the axles, means for deflecting the front axle, a central stationary ring disposed on one side of the front axle, reciprocating rods coupled to the clutches, oscillating tripping-levers pivotally connected to said rods and axle, and suitable formations on the ring for tripping said levers and actuating one of the rods upon deflection of the axle in one direction, substantially as set forth.

7. In an automobile driving-gear, front and rear axles, wheels loosely mounted on the same, clutches for coupling the wheels to the axles, means for deflecting the front axle, a central stationary ring disposed on one side of the front axle, reciprocating rods coupled to the clutches, oscillating tripping-levers pivotally connected to said rods and to said axle, outwardly-projecting shoulders formed on opposite sides of the ring, a roller on each lever normally resting at the base of the shoulder, the lever on one side being adapted to be tripped with the deflection of the axle in one direction, and the clutch released from the corresponding wheel, substantially as set forth.

8. In an automobile driving-gear, front and rear axles, wheels loosely mounted on the same, clutches for coupling the wheels to the axles, means for deflecting the front axle, clutch-controlling devices carried by the front axle, and stationary devices mounted on the vehicle for actuating the clutch-controlling devices upon a deflection of the front axle in either direction, substantially as set forth.

9. In an automobile driving-gear, front and rear axles, wheels loosely mounted on the same, clutches for coupling the wheels to the axles, means for deflecting the front axle, a stationary ring having concentric peripheral sections and expanded portions, and shoulders connecting said concentric sections with the expanded portions, suitable clutch-controlling devices, the latter being set into motion by the shoulder on one side of the ring with the deflection of the front axle in either direction, thereby uncoupling the wheel from the axle on one side of the vehicle, substantially as set forth.

10. In an automobile driving-gear, front and rear axles, means for imparting rotation to the same, wheels loosely mounted on the rear axle, sliding shoes on the vehicle, means for actuating the shoes upon the deflection of the front axle, clutches for coupling the wheels to the rear axle, and intermediate connections between the shoes and said rear clutches for releasing the latter from their respective wheels upon the movement of the shoes in one direction, substantially as set forth.

11. In an automobile driving-gear, front and rear axles, wheels loosely mounted on the rear axle, a coupling-pole, shoes slidingly mounted on said pole, tripping-levers on the coupling-pole adapted to be struck by the shoes upon the movement of the latter in one direction, clutches for clamping the rear wheels to their axle, and intermediate connections between the tripping-levers and the clutches for releasing the latter from their wheels upon the tripping of the levers by said shoes in one direction, substantially as set forth.

12. In an automobile driving-gear, a split clutch-disk, a wheel-hub inclosing said disk, toggle-levers carried by said disk, and a clutch-cam having a series of lobes movable along the axle of the vehicle and actuating said toggles, substantially as set forth.

13. In an automobile driving-gear, front and rear axles, means for propelling the vehicle, a rotatable steering-shaft, converging screw-shafts having terminal intermeshing bevel-pinions actuated by said shaft simultaneously in opposite directions, sliding nuts on said screw-shafts, intermediate connections between said nuts and front axle for deflecting the latter upon movement of the nuts along the screw-shafts, clutches for coupling the wheels to the respective axles, and stationary devices for simultaneously uncoupling the inner front and rear wheels from their axles upon the deflection of the front axle, substantially as set forth.

14. In an automobile driving-gear, front and rear axles, means for imparting rotation to the same, a coupling-pole connecting the front and rear trucks, a pair of screw-shafts, means for simultaneously rotating said shafts in opposite directions, nuts traveling along said screw-shafts, and intermediate connections between said nuts and front axle for deflecting the latter upon rotation of the shafts in either direction, substantially as set forth.

15. In an automobile driving-gear, an axle, a split clutch-disk rotatable about the same, a wheel-hub inclosing said disk, toggle-levers carried by said disk, a clutch-cam movable along the axle, and a buffer-spring coupled to said clutch-cam, substantially as set forth.

In testimony whereof I affix my signature in presence of two witnesses.

PETER STEINHAUER.

Witnesses:
EMIL STAREK,
G. L. BELFRY.